(12) United States Patent
Wang et al.

(10) Patent No.: US 9,371,457 B2
(45) Date of Patent: Jun. 21, 2016

(54) STABLE COLOR-CHANGING INK

(71) Applicant: Yong Wang, Linyi, Shandong (CN)

(72) Inventors: Yong Wang, Linyi (CN); Lu Liu, Linyi (CN)

(73) Assignee: Yong Wang, Linyi (CN)

( * ) Notice: Subject to any disclaimer, the term of this patent is extended or adjusted under 35 U.S.C. 154(b) by 5 days.

(21) Appl. No.: 14/571,318

(22) Filed: Dec. 16, 2014

(65) Prior Publication Data

US 2016/0024321 A1   Jan. 28, 2016

(30) Foreign Application Priority Data

Jul. 23, 2014 (CN) .......................... 2014 1 0353671

(51) Int. Cl.
| | |
|---|---|
| *C09D 11/16* | (2014.01) |
| *C09D 11/30* | (2014.01) |
| *C09D 11/17* | (2014.01) |
| *C09D 11/50* | (2014.01) |
| *C09D 133/00* | (2006.01) |
| *C09D 139/06* | (2006.01) |

(52) U.S. Cl.
CPC ................ *C09D 11/16* (2013.01); *C09D 11/17* (2013.01); *C09D 11/30* (2013.01); *C09D 11/50* (2013.01); *C09D 133/00* (2013.01); *C09D 139/06* (2013.01)

(58) Field of Classification Search
None
See application file for complete search history.

(56) References Cited

U.S. PATENT DOCUMENTS

| | | | | |
|---|---|---|---|---|
| 2005/0019090 A1* | 1/2005 | Takasu | .................. | B43K 1/086 401/214 |
| 2012/0251222 A1* | 10/2012 | Toomi | ...................... | B43K 7/00 401/209 |

FOREIGN PATENT DOCUMENTS

CN        102575123 A        7/2012

* cited by examiner

*Primary Examiner* — An Do
*Assistant Examiner* — Renee I Wilson

(57) ABSTRACT

The present invention discloses a stable color-changing ink, which includes the following components in parts by weight: 10 to 60 parts of water, 0.1 to 2 parts of a pH regulator, 0.1 to 1 part of a corrosion inhibitor, 0.1 to 3 parts of a dispersant, 0.1 to 3 parts of an emulsion type lubricant, 0.5 to 10 parts of a water soluble resin, 10 to 50 parts of a microcapsule color-changing pigment, and 0.1 to 3 parts of a thickener. The present invention achieves the stability of an ink system and the stability of the writing effect, and can be used in different application fields, involving color-changing gel inks, color-changing watercolor inks, color-changing water-based inks, color-changing medium oil inks, color-changing fountain pen inks, color-changing writing brush inks, color-changing writing brush inks, color-changing inkjet inks, anti-counterfeiting inks, high-temperature disappearing inks, and other application systems.

13 Claims, No Drawings

STABLE COLOR-CHANGING INK

CROSS-REFERENCE TO RELATED PATENT APPLICATION

The present patent application claims benefit of Chinese patent application No. 201410353671.6 filed on Jul. 23, 2014, the entire contents of which are incorporated by reference.

BACKGROUND

1. Technical Field

The present invention relates to the field of inks, and in particular, to a stable color-changing ink.

2. Related Art

With the continuous development of the microcapsule pigment synthesis technology in China, the color changing form of microcapsule pigments shows a trend of diversification, and microcapsule pigments are mainly used in the industries of plastics, textiles, printing, coatings and inks. By adding a microcapsule color-changing pigment, the application functions of the product is increased, and the added value of the product is improved, thereby making the various industries have more vigor. However, few people use microcapsule pigments in stationery writing tools, because the ink quality requirements for writing tools are very high. Furthermore, the particle diameter of the microcapsule pigment is large (generally 1 to 20 μm), and the average particles diameter can merely be controlled within the range of 1 to 3 micrometers, which far exceeds the nanoscale diameter of common inks, and therefore, the stability of the ink system becomes a problem. At the same time, due to large particle diameter, the stability of the writing effect is influenced, and hollow phenomenon, ink accumulation phenomenon, disconnection phenomenon and other phenomena occur.

In the writing ink industry standards, the stability of common inks needs to be detected by a high-temperature baking detection, high-speed centrifugation detection and scribing length detection. As for the hardest high-speed centrifugation detection, the ink is generally centrifuged by a high-speed centrifuge for 1 to 2 hrs at a speed of 2000 rpm or 2500 rpm, and the stability is determined according to the difference in color between the upper layer and the lower layer of the centrifuged ink, and color consistency of the upper layer and the lower layer indicates that the stability is high.

Presently, Chinese Patent Application Publication No. CN 102575123 A, of which the Publication Date is Jul. 11, 2012 and the applicant is PILOT INK CO., LTD, discloses a reversibly thermochromic water-based ink composition, which includes water, a water soluble organic solvent, a reversibly thermochromic microcapsule pigment, a comb-like polymer dispersant having a carboxyl group on the side chain, an organic compound containing nitrogen and sulfur and a water soluble resin. The reversibly thermochromic microcapsule pigment contains: (A) an electron-donating color-rendering organic compound, (B) electron-accepting compound, and (C) a reversibly thermochromic composition formed by a reaction medium that determines the reaction temperature of the chromogenic reaction of (A) and (B) The friction color-changing gel pen formulated according to this formula cannot meet the standard in the high-speed centrifugation detection, after the high-speed centrifuge rotates for 30 min at a speed of 2000 rpm, pen point blockage and ink layering occur, so that the application and promotion of this formula or the microcapsule color-changing pigment are limited, for example, this formula or the microcapsule color-changing pigment cannot be used in push-type or direct-fluid watercolor pens, writing brushes, pens, inkjet inks. Possible reasons lie in that, in addition to controlling the particle diameter of the microcapsule color-changing pigment, some other disadvantages or some places needing to be improved still exist. In this formula, the average particle diameter (the average value of the maximum diameter) of the microcapsule pigment is within the range of 0.5 to 5.0 μm, preferably within the range of 1.0 to 4.0 μm, and more preferably within the range of 1.0 to 3.0 μm.

SUMMARY

In view of the above, in order to overcome the above disadvantages, the inventors of the present invention found through exploration that in addition to control of the particle diameter of the microcapsule color-changing pigment, coordination of ratio and synergistic effect with other components may also be involved, and it may be the only way to achieve both high stability of the ink system and stability of the writing effect. Therefore, the inventors of the present invention complete the present invention through a lot of intensive studies by paying creative effects.

The present invention is aimed to provide a stable color-changing ink, which includes a series of stable color-changing inks formed on the basis of stability including the stability of the ink system and the stability of the writing effect.

Specifically, the present invention provides a general formula of a series of stable color-changing inks, which can achieve different applications by means of minute adjustment and extension of the formula.

The formula of the stable color-changing ink includes the following components in parts by weight:
- 10 to 60 parts of water,
- 0.1 to 2 parts of a pH regulator,
- 0.1 to 1 part of a corrosion inhibitor,
- 0.1 to 3 parts of a dispersant,
- 0.1 to 3 parts of an emulsion type lubricant,
- 0.5 to 10 parts of a water soluble resin,
- 10 to 50 parts of a microcapsule color-changing pigment, and
- 0.1 to 3 parts of a thickener.

In this formula, by combining a dispersant, a water soluble resin, a thickener and a microcapsule color-changing pigment through adhesion, and at contents and ratios obtained after multiple times of experiments with labor efforts are obtained, the microcapsule pigment is evenly dispersed in the system and maintained in a suspension state. Furthermore, the microcapsule color-changing pigment is evenly dispersed by means of the dispersant, the water soluble resin and the microcapsule pigment are combined and adhered to each other, and then cooperate with the thickener for mutual promotion, so as to reach an even and stable suspension state, thereby forming a very stable ink system. The corrosion inhibitor is mainly used to protect the metal tip for filling the ink into the writing tool from being corroded and getting rusty, so as to eliminate influence on writing, thereby improving the stability of the writing effect. The pH regulator is mainly used to adjust the pH value of the ink. The emulsion type lubricant is mainly used to increase the fluidity and lubricity of the ink, and at the same time, is provided with some emulsifying capability. On one hand, the components play a corresponding role respectively, and on the other hand, they also cooperate with each other, so that the color-changing ink of this formula can reach a stable state.

For example, a color-changing gel ink is formulated according to this formula, and then filled in a gel pen, in the experiment of high-speed centrifugation detection, after 60-min high-speed centrifugation for 60 min at a speed of 2000 rpm, no layering occurs in the ink, after 120-min centrifugation, no tip blockage occurs, and writing is normal. The color-changing gel ink can meet the common ink industry standard, thereby achieving the effects of high stability of the ink system and high stability of the writing effect.

Accordingly, under the premise that this formula containing the microcapsule pigment is stable, various thermochromic, photochromic, pressure-sensitive and scented microcapsule pigments can be widely used. By means of minute adjustment and extension of the formula, this formula can be used in different applications including application systems of color-changing gel inks, color-changing watercolor inks, color-changing water-based inks, color-changing medium oil inks, color-changing fountain pen inks, color-changing writing brush inks, color-changing painting inks, color-changing inkjet inks, anti-counterfeiting inks and high temperature disappearing inks.

In the following the formula is further optimized.

On the basis of the above formula, the water is deionized water or distilled water having a conductivity less than or equal to 0.5 μs/cm, the water quality having a low conductivity of less than or equal to 0.5 μs/cm is selected to reduce the flocculation of the particle of the system, so as to further improve the stability of the whole system.

On the basis of the optimized formula, the formula may further include an anti-mildew bactericide of 0.1 to 1 part (by weight).

On the basis of the optimized formula containing an anti-mildew bactericide, the formula may further include a solvent of 5 to 25 parts (by weight).

On the basis of the above formula and/or the optimized formula, the anti-mildew bactericide is a water-based low-toxicity broad-spectrum bactericide, for example, water-based low-toxicity bactericides Kathon or PROGIYEN series.

The pH regulator may be one or more selected from triethanolamine, sodium bicarbonate, potassium hydroxide, and disodium hydrogen phosphate. Further, the parts of the pH regulator may be preferably 0.5 to 1.5 parts.

The solvent may be a cosolvent, a moisturizing solvent, or a polar solvent, for example, one or more selected from ethylene glycol, propylene glycol, glycerol, triethylene glycol, dipropylene glycol, trimethylolpropane (TMP), polyethylene glycol 200, polyethylene glycol 400, polypropylene glycol 200, and polypropylene glycol 400, which is selectively added to the formula when dissolution enhancement or moisturizing performance improvement is required. The volatile polar solvent, for example, ethanol and/or acetone, is selectively added when the drying time of the ink needs to be improved.

The corrosion inhibitor may be one or more selected from benzotriazole, water soluble mercaptobenzothiazole, and methylbenzothiazole.

The dispersant may be a water-based polyurethane dispersant, having good dispersion effect on the microcapsule pigment, for example, Genwater soluble series of DFN/0451/PP100/0450 from Borchers and similar dispersants. After evenly dispersing the microcapsule pigment by the dispersant, the water soluble resin and the microcapsule pigment are combined and adhered to each other, and then cooperate with the thickener for mutual promotion, so as to reach an even and stable suspension state.

The emulsion type lubricant may be one or more selected from oleic acid, potassium oleate, sodium oleate, sodium linoleate, sodium ricinoleate, and phosphoric ester.

The water soluble resin may be a polyvinylpyrrolidone resin and/or an acrylic polymer resin, can be well combined with the wall rinse of the microcapsule color-changing pigment, and at the same time have mutually promotion effect with the thickener, so as to finally form a mutually adhered and promoted stable suspension system, thereby achieving suspension stabilization effect on the microcapsule color-changing pigment, even on other microcapsule color-changing pigments having a great specific gravity and large particle diameter.

The thickener is used to improve and increase the viscosity of the ink, and coordinate the resin component in the patent to combine with the microcapsule, so as to improve the anti-settlement property of the microcapsule and maintain the stability of the product. At the same time, the thicker can impart good fluidity and thixotropy to gel pen inks and improve the shear thinning index, so as to achieve fluent writing and full color. By formulation of different thickeners at different proportions, when the viscosity of the ink is low, the suspension stability of the microcapsule pigment is maintained, the requirements for watercolor ink can also be met, and the ink can not only be used in conventional watercolor pens, but also can be used in push-type watercolor pens, capillary system watercolor pens and fountain pens. Due to the low viscosity, the ink can also be used in ink-jet printer through adjustment of the formula. The thickener specifically may be formed by mixing one or more selected from a cellulose ether (such as one or more selected from methylcellulose, hydroxypropyl methylcellulose, sodium carboxymethylcellulose, and hydroxyethyl cellulose), a natural polymer and its derivatives (such as one or more selected from gelatin, sodium alginate, guar gum, chitosan, gum Arabic, and xanthan gum), and synthetic polymer (such as one or more selected from polyacrylamide, polyvinylpyrrolidone, carbomer resin, polyacrylic acid, polyacrylate copolymer emulsion, polyurethane, and modified polyurea). The thickener is preferably formed by mixing one selected from hydroxyethyl cellulose and xanthan gum, and one or more selected from polyvinylpyrrolidone, carbomer resin, and polyacrylate copolymer emulsion.

The microcapsule color-changing pigment may be an aqueous emulsion of a microcapsule pigment, a mixture of an aqueous emulsion of a microcapsule pigment and a common pigment paste, or a mixture of an aqueous emulsion of a microcapsule pigment and a dye. The aqueous emulsion of a microcapsule pigment includes one or more selected from a thermochromic microcapsule pigment, a photochromic microcapsule pigment, and a pressure-sensitive microcapsule pigment.

For the thermochromic microcapsule pigment, the color changes according to different temperatures, and the color changing form includes changing from colorful to colorless (that is, from one color to non-color), changing from colorless to colorful, and changing from colorful to colored (that is, from one color to another color).

According to properties, the thermochromic microcapsule pigment is classified into reversible thermochromic microcapsule pigment for which the color can be restored and irreversible thermochromic microcapsule pigment for which the color cannot be restored after disappearance.

According to the color-changing temperature range, the thermochromic microcapsule pigment is classified into small-range thermochromic microcapsule pigment, moderate-range thermochromic microcapsule pigment and large-range thermochromic microcapsule pigment, and most of thermochromic microcapsule pigments are reversible thermochromic microcapsule pigments.

As for a small-range thermochromic microcapsule pigment, the pigment is colorful at a normal temperature, the color begins to disappear when the temperature reaches 28° C. and completely disappears when the temperature reaches 32° C., and the color begins to appear when the temperature is decreased to 25° C. and completely appears when the temperature is decreased to 22° C.

As for a moderate-range thermochromic microcapsule pigment, the pigment is colorful at a normal temperature, the color begins to disappear when the temperature reaches 31° C. and completely disappears when the temperature reaches 35° C., and the color begins to appear when the temperature is decreased to 8° C. and completely appears when the temperature is decreased to 4° C.

As for a large-range thermochromic microcapsule pigment, the pigment is colorful at a normal temperature, the color begins to disappear when the temperature reaches 48° C. and completely disappears when the temperature reaches 55° C., and the color begins to appear when the temperature is decreased to −5° C. and completely appears when the temperature is decreased to −18° C. These three examples are reversible changing form colorful to colorless, and other examples may also be changing form colorless to colorful or colorful to colorful.

The small-range, moderate-range and large-range thermochromic microcapsule pigments are commercially available in the market, for example, from Taiwan New Prismatic Enterprise Co., Ltd.

Thermochromic microcapsule pigments changing at different temperatures may also be mixed with a common pigment to achieve different color changing at different temperatures, and may also be mixed with an irreversible thermochromic microcapsule pigment, and formulated according to requirements of changes of different colors.

As for a photochromic microcapsule pigment, different changes of color is realized through conversion of reception and lose of UV light, and the main change form includes changing from colorless to colorful, changing from colorful to colorless, and changing from colorful to colorful, or change of different colors is realized according to different wavelength of the UV light.

As for the pressure-sensitive microcapsule pigment, color changing is realized by receiving different pressures.

The thermochromic microcapsule pigment and the photochromic microcapsule pigment can be mixed, so that change of different colors can be realized according to the change of the temperature and the UV light. The pressure-sensitive microcapsule pigment can also be mixed with the thermochromic microcapsule pigment or the photochromic microcapsule pigment, so as to realize more forms of changes.

DETAILED DESCRIPTION

The present invention is described in detail below through specific examples, but the purpose and objective of these exemplary embodiments are merely to illustrate the present invention, but not to form any limitation of any form on the actual protection scope of the present invention and not to limit the protection scope of the present invention thereto.

As previously described, the inventors of the present invention complete the present invention through multiple times of component adjustments and amount tests with labor efforts. In the following, merely some better research experiments are illustrated, the experiments involve some adjusted specific components and specific contents, these limited number of examples are not exhaustive, other components and proportions obtained according to the examples through adjustment by those of ordinary skill in the art have expectable effects, should fall within the scope of disclosure of the present invention and having expectable effect shall fall within the scope of disclosure of the present invention.

Additionally, unless otherwise specified, the parts of the components in the following are all by weight.

Example 1

Changing from Colorful to Colorless in a Small Range

| | |
|---|---|
| Deionized water (conductivity of 0.25 µs/cm) | 50 parts |
| 515PROGIVEN | 0.5 part |
| Triethanolamine | 1 part |
| Glycerol | 20 parts |
| Benzotriazole | 1 part |
| GEN0451 | 1 part |
| Potassium oleate | 1 part |
| Acrylic polymer resin | 5 parts |
| Microcapsule color-changing pigment | 20 parts |
| Xanthan gum and polyvinylpyrrolidone | 1 part |

In this example, the microcapsule color-changing pigment was selected to be a red small-range reversible thermochromic microcapsule pigment changing from colorful to colorless, the synthesized high-viscosity ink was filled into a gel pen for writing, the writing was red at a normal temperature, the color began to disappear when the temperature reached 28° C. and completely disappeared to be colorless when the temperature reached 32° C., and the color began to appear when the temperature was decreased to 25° C. and completely appeared when the temperature was decreased to 22° C. The color changing process can be cycled. The content of the acrylic polymer resin in the formula was adjusted to be 2 parts, the content of xanthan gum and polyvinylpyrrolidone was adjusted to be 0.1 parts, and the content of deionized water was correspondingly increased with other contents maintained to be unchanged. As a result, the viscosity of the ink was decreased, and the ink was applicable to watercolor pens, especially to push-type or direct-fluid watercolor pens, and better effect was achieved.

Example 2

Changing from Colorful to Colorless in a Moderate Range

| | |
|---|---|
| Deionized water (conductivity of 0.25 µs/cm) | 10 parts |
| 515PROGIVEN | 0.1 part |
| Sodium bicarbonate | 0.5 part |
| Dipropylene glycol | 5 parts |
| Methylbenzothiazole | 0.1 part |
| GEN0451 | 0.1 part |
| Sodium oleate | 0.1 part |
| Acrylic polymer resin | 0.5 part |
| Microcapsule color-changing pigment | 10 parts |
| Xanthan gum | 0.3 part |

In this example, the microcapsule color-changing pigment was selected to be blue moderate-range reversible thermochromic microcapsule pigment changing from colorful to colorless, the synthesized high-viscosity ink was filled into a gel pen for writing, the writing was blue at a normal temperature, the color began to disappear when the temperature reached 31° C. and completely disappeared when the temperature reached 35° C., and the color began to appear when the temperature was decreased to 8° C. and completely appeared when the temperature was decreased to 4° C. The color changing process can be cycled. The content of the acrylic polymer resin in the formula was adjusted to be 2 parts, the content of xanthan gum and polyvinylpyrrolidone was adjusted to be 0.15 part, and the content of deionized water was correspondingly increased with other contents maintained to be unchanged. As a result, the viscosity of the ink was decreased, and the ink was applicable to watercolor pens, especially to push-type or direct-fluid watercolor pens, and better effect was achieved.

Example 3

Changing from Colorful to Colorless in a Large Range

| | |
|---|---|
| Deionized water (conductivity of 0.25 μs/cm) | 60 parts |
| 515PROGIVEN | 1 part |
| Disodium hydrogen phosphate | 1.5 parts |
| Polyethylene glycol 200 | 25 parts |
| Water soluble mercaptobenzothiazole | 1 part |
| GEN0451 | 3 parts |
| Oleic acid | 3 parts |
| Polyvinylpyrrolidone resin | 10 parts |
| Microcapsule color-changing pigment | 50 parts |
| Hydroxyethyl cellulose and carbomer resin | 2 parts |

In this example, the microcapsule color-changing pigment was selected to be a black large-range reversible thermochromic microcapsule pigment changing from colorful to colorless, the synthesized high-viscosity ink was filled into a gel pen for writing, the writing was black at a normal temperature, the color began to disappear when the temperature reached 48° C. and completely disappeared when the temperature reached 55° C., and the color began to appear when the temperature was decreased to −5° C. and completely appeared when the temperature was decreased to −18° C. The color changing process can be cycled.

In Examples 1 to 3, the pigments are small-range, moderate-range or large-range reversible microcapsule pigments changing from colorful to colorless, and similarly in Examples 1 to 3, the microcapsule color-changing pigment can be replaced by a reversible microcapsule pigment changing from colorless to colorful in different ranges. The situation that the microcapsule color-changing pigment being a large-range reversible microcapsule pigment changing from colorless to colorful is taken as an example, as shown in Example 4.

Example 4

Changing from Colorless to Colorful in a Large Range

| | |
|---|---|
| Deionized water (conductivity of 0.2 μs/cm) | 30 parts |
| 515PROGIVEN | 0.5 part |
| Triethanolamine | 0.8 part |
| Glycerol | 15 parts |
| Benzotriazole | 0.5 part |
| GEN0451 | 1.5 parts |
| Potassium oleate | 1.5 parts |
| Polyvinylpyrrolidone resin | 5 parts |
| Microcapsule color-changing pigment | 30 parts |
| Xanthan gum, polyvinylpyrrolidone and carbomer resin | 3 parts |

In this example, the microcapsule color-changing pigment was selected to be a black large-range reversible thermochromic microcapsule pigment changing from colorless to colorful, the synthesized high-viscosity ink was filled into a gel pen for writing, the writing was colorless at a normal temperature, the color began to appear when the temperature reached 50° C. and completely appeared when the temperature reached 58° C., and the color began to disappear when the temperature was decreased to −5° C. and completely disappeared when the temperature was decreased to −20° C. The color changing process can be cycled. The content of the polyvinylpyrrolidone resin was adjusted to be 2 parts, the content of xanthan gum, polyvinylpyrrolidone and carbomer resin was adjusted to be 0.1 part, and the content of deionized water was correspondingly increased with other contents maintained to be unchanged. As a result, the viscosity of the ink was decreased, and the ink was applicable to watercolor pens, especially to push-type or direct-fluid watercolor pens, and better effect was achieved. Similarly, the large-range reversible thermochromic microcapsule pigment changing from colorless to colorful in Example 4 can be adjusted to be a small-range or moderate-range reversible thermochromic microcapsule pigment changing from colorless to colorful.

In Examples 1 to 4, the pigments are reversible thermochromic microcapsule pigments, and similarly, can be adjusted to be an irreversible thermochromic microcapsule pigment, as shown in Example 5.

Example 5

Irreversible Pigment

| | |
|---|---|
| Deionized water (conductivity of 0.1 μs/cm) | 20 parts |
| 515PROGIVEN | 0.4 part |
| Disodium hydrogen phosphate | 1.2 parts |
| Polypropylene glycol 400 | 20 parts |
| Benzotriazole | 0.4 part |
| GEN0451 | 0.6 part |
| sodium linoleate | 1.5 parts |
| acrylic polymer resin | 5 parts |
| microcapsule color-changing pigment | 20 parts |

Hydroxyethyl cellulose, polyacrylate copolymer emulsion and carbomer resin 3 parts In this example, the microcapsule color-changing pigment was selected to be a yellow irreversible thermochromic pigment, the synthesized high-viscosity ink was filled into a gel pen for writing, the writing was yellow at a normal temperature, the color began to disappear when the temperature reached 55° C. and completely disappeared when the temperature reached 60° C., and the writing was still colorless when the temperature was decreased to −35° C. The color disappearance is irreversible. The content of the acrylic polymer resin in the formula was adjusted to be 2 parts, the content of hydroxyethyl cellulose, polyacrylate copolymer emulsion and carbomer resin was adjusted to 0.1 part, and the content of deionized water was correspondingly increased with other contents maintained to be unchanged. As a result, the viscosity of the ink was decreased, and the ink was applicable to watercolor pens, especially to push-type or direct-fluid watercolor pens, and better effect was achieved.

In Example 5, the irreversible thermochromic pigment changes from colorful to colorless, and similarly, may be in the color changing form changing from colorless to colorful and from colorful to colorful.

In Examples 1 to 5, regardless of reversible or irreversible color changing form, and regardless of small range, moderate range or large range, the changing from colorful to colorful can be achieved by adding a common pigment or dye. For example, to the red small-range reversible thermochromic microcapsule pigment changing from colorful to colorless in Example 1, phthalocyanine blue is added and mixed, due to addition of blue to red and blue, the color of the microcapsule color-changing pigment is changed to be a purple microcapsule color-changing pigment, and the ink is purple at a normal temperature. The red color in the ink begins to disappear when the temperature reaches 28° C., and ink begins to lose the red color and change into blue. The red color completely disappears when the temperature reaches 32° C., and the ink changes into blue. The red color in the ink beings to appear when the temperature is decreased to 25° C., and the ink begins to change from blue into purple. The red color in the ink completely appears when the temperature is decreased to 22° C., and the ink turns into purple again.

Example 6

Photochromic Pigment

| | |
|---|---|
| Deionized water | 40 parts |
| 515PROGIVEN | 0.8 part |
| Triethanolamine | 0.9 part |
| TMP | 20 parts |
| Benzotriazole | 1 part |
| GEN0451 | 1 part |
| Sodium ricinoleate | 2 parts |
| Acrylic polymer resin | 5 parts |
| Microcapsule color-changing pigment | 20 parts |
| Xanthan gum, polyvinylpyrrolidone, polyacrylate copolymer emulsion and carbomer resin | 3 parts |

In this example, the microcapsule color-changing pigment was selected to a purple photochromic pigment, the synthesized high-viscosity ink was filled into a gel pen for writing, the writing was colorless indoor, and turned into purple after contacting with sunlight outdoor or after UV irradiation. The content of the acrylic polymer resin in the formula was adjusted to be 2 parts, the content of xanthan gum, polyvinylpyrrolidone, polyacrylate copolymer emulsion and carbomer resin was adjusted to be 0.1 part, and the content of deionized water was correspondingly increased with other contents maintained to be unchanged. As a result, the viscosity of the ink was decreased, and the ink was applicable to watercolor pens, especially to push-type or direct-fluid watercolor pens, and better effect was achieved. In this example, the photochromic pigment is a reversible pigment changing from colorless to colorful and may also be adjusted to be an irreversible pigment, and the similarly, the color changing form can be adjusted to changing from colorful to colorless and from colorful to colorful. The changing from colorful to colorful of the photochromic microcapsule color-changing pigment can be achieved by adding a common pigment or dye.

The microcapsule color-changing pigment in the examples can be similarly adjusted to be a pressure-sensitive microcapsule pigment or scented microcapsule pigment, which is also applicable in the ink system of the present invention and also has very high stability.

The microcapsule color-changing pigments in Examples 1 to 5 are thermochromic microcapsule pigments, and the microcapsule color-changing pigment in Example 6 is a photochromic microcapsule pigment. In order to increase the complexity of color changing, the microcapsule color-changing pigments in Examples 1 to 5 can be combined with the microcapsule color-changing pigment in Example 6, or be combined with a pressure-sensitive microcapsule pigment or be replaced by a pressure-sensitive microcapsule pigment for more different color changing under different conditions, so as to bring visual impacts and be used in an anti-counterfeiting ink. The high-viscosity inks in the examples can be used as color-changing gel inks, and can also be used as color-changing medium oil inks, color-changing water-based inks, high temperature disappearing inks and color-changing painting inks. The formula with reduced viscosity can be used in color-changing watercolor inks, and can also be used in color-changing fountain pen inks, color-changing writing brush inks and color-changing inkjet inks.

Detection Method and Detection Results

All the inks in Examples 1 to 6 were stored in a drying oven of 50° C. and a refrigerator of −20° C. for 1 month, and no layering and deterioration were observed. The viscosity of the high-viscosity ink was detected to be 1500 to 1800 mpa·s, the ink was filled into a 0.5 mm gel pen for writing, and the writing was full without occurrence of hollow phenomenon and disconnection phenomenon and ink accumulation phenomena. In the experiment of high-speed centrifugation detection, after high-speed centrifugation for 60 min at a speed of 2000 rpm, no layering occurred in the ink, after 120-min centrifugation, no tip blockage occurred, and the writing was normal. All the inks can meet the common ink industry standard, thereby achieving the effects of high stability of the ink system and high stability of the writing effect. The viscosity of the low-viscosity ink was detected to be 200 to 400 mpa·s. After 30-min centrifugation at a speed of 2000 rpm in a high-speed centrifuge, the writing was normal and also had very high stability.

It should be understood that, these examples are merely used to illustrate the present invention, but not intended to limit the protection scope of the present invention. Additionally, it also should be understood that, after viewing the technical contents of the present invention, those of ordinary skill in the art can make various variations, alternations and/or modifications on the present invention, all these equivalent forms also fall within the protection scope defined by the appended claims of this application.

What is claimed is:

1. A stable color-changing ink, comprising the following components in parts by weight:
   10 to 60 parts of water,
   0.1 to 2 parts of a pH regulator,
   0.1 to 1 part of a corrosion inhibitor,
   0.1 to 3 parts of a dispersant, the dispersant being a water-based polyurethane dispersant,
   0.1 to 3 parts of an emulsion type lubricant,
   0.5 to 10 parts of a water soluble resin,
   10 to 50 parts of a microcapsule color-changing pigment, and
   0.1 to 3 parts of a thickener;
   wherein the microcapsule color-changing pigment is an aqueous emulsion of a microcapsule pigment, or a mixture of an aqueous emulsion of a microcapsule pigment and a common pigment paste, or a mixture of an aqueous emulsion of a microcapsule pigment and a dye; and
   wherein the aqueous emulsion of a microcapsule pigment comprises one or more selected from a thermochromic microcapsule pigment, a photochromic microcapsule pigment, and a pressure-sensitive microcapsule pigment.

2. The stable color-changing ink according to claim 1, wherein the water is deionized water or distilled water having conductivity of less than or equal to 0.5 μs/cm.

3. The stable color-changing ink according to claim 2, further comprising 0.1 to 1 part by weight of anti-mildew bactericide.

4. The stable color-changing ink according to claim 3, further comprising 5 to 25 parts by weight of a solvent.

5. The stable color-changing ink according to claim 3, wherein the anti-mildew bactericide is a water-based low-toxicity broad-spectrum bactericide.

6. The stable color-changing ink according to claim 1, wherein the pH regulator is one or more selected from triethanolamine, sodium bicarbonate, potassium hydroxide, and disodium hydrogen phosphate.

7. The stable color-changing ink according to claim 4, wherein the solvent is a cosolvent, a moisturizing solvent, or a polar solvent.

8. The stable color-changing ink according to claim 7, wherein the cosolvent or the moisturizing solvent is one or more selected from ethylene glycol, propylene glycol, glycerol, triethylene glycol, dipropylene glycol, trimethylolpropane, triethylene glycol, polyethylene glycol 200, polyethylene glycol 400, polypropylene glycol 200, and polypropylene glycol 400, wherein the polar solvent is ethanol and/or acetone.

9. The stable color-changing ink according to claim 1, wherein the corrosion inhibitor is one or more selected from benzotriazole, water soluble mercaptobenzothiazole, and methylbenzothiazole.

10. The stable color-changing ink according to claim 1, wherein the emulsion type lubricant is one or more selected from oleic acid, potassium oleate, sodium oleate, sodium linoleate, sodium ricinoleate, and phosphoric ester.

11. The stable color-changing ink according to claim 1, wherein the water soluble resin is a polyvinylpyrrolidone resin and/or an acrylic polymer resin.

12. The stable color-changing ink according to claim 1, wherein the thickener comprises one or more selected from a cellulose ether, a natural polymer and its derivatives, and a synthetic polymer, wherein:

the cellulose ether is one or more selected from methylcellulose, hydroxypropyl methylcellulose, sodium carboxymethylcellulose, and hydroxyethyl cellulose;

the natural polymer and its derivatives is one or more selected from gelatin, sodium alginate, guar gum, chitosan, Arabic gum, and xanthan gum; and the synthetic polymer is one or more selected from polyacrylamide, polyvinylpyrrolidone, carbomer resin, polyacrylic acid, polyacrylate copolymer emulsion, polyurethane, and modified polyurea.

13. The stable color-changing ink according to claim 12, wherein the thickener is a composition of one selected from hydroxyethyl cellulose and xanthan gum, and one or more selected from polyvinylpyrrolidone, polyacrylate copolymer emulsion, and carbomer resin.

\* \* \* \* \*